United States Patent
Baluch et al.

(10) Patent No.: US 9,753,846 B2
(45) Date of Patent: Sep. 5, 2017

(54) ADJUSTING THE OPERATING MEMORY USED BY A VIRTUAL MACHINE DURING RUNTIME

(75) Inventors: Marek Baluch, Nové Mesto n. Váhom (SK); Jiri Sedlacek, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 259 days.

(21) Appl. No.: 13/604,992

(22) Filed: Sep. 6, 2012

(65) Prior Publication Data
US 2014/0068610 A1 Mar. 6, 2014

(51) Int. Cl.
*G06F 9/455* (2006.01)
*G06F 12/02* (2006.01)

(52) U.S. Cl.
CPC ........ *G06F 12/023* (2013.01); *G06F 9/45558* (2013.01); *G06F 2009/45583* (2013.01); *G06F 2212/1032* (2013.01); *G06F 2212/152* (2013.01)

(58) Field of Classification Search
None
See application file for complete search history.

(56) References Cited

U.S. PATENT DOCUMENTS

| | | | |
|---|---|---|---|
| 5,093,913 A * | 3/1992 | Bishop | G06F 9/5016 711/148 |
| 5,966,537 A * | 10/1999 | Ravichandran | G06F 8/443 717/158 |
| 6,286,016 B1 * | 9/2001 | Heller et al. | |
| 6,658,652 B1 * | 12/2003 | Alexander, III | G06F 9/5016 707/999.202 |
| 6,757,895 B1 * | 6/2004 | Beadle et al. | 718/1 |
| 6,971,097 B1 * | 11/2005 | Wallman | 718/101 |
| 7,421,533 B2 * | 9/2008 | Zimmer | G06F 12/126 711/170 |
| 7,475,214 B2 * | 1/2009 | Hwang | G06F 11/3612 711/170 |
| 7,716,446 B1 * | 5/2010 | Chen | G06F 9/5016 711/170 |
| 7,873,814 B1 * | 1/2011 | Cohen et al. | 712/209 |
| 7,873,943 B2 * | 1/2011 | Wu | G06F 9/45516 707/813 |
| 8,127,280 B2 * | 2/2012 | Thomas | G06F 8/4442 717/136 |
| 8,341,606 B2 * | 12/2012 | Chung | G06F 9/4425 717/136 |
| 8,356,061 B2 * | 1/2013 | Vengerov | G06F 12/0253 707/813 |
| 8,990,532 B2 * | 3/2015 | Obata | G06F 12/0253 707/813 |
| 2001/0051970 A1 * | 12/2001 | Webb | 709/1 |
| 2002/0129078 A1 * | 9/2002 | Plaxton | G06F 9/445 718/1 |
| 2002/0129177 A1 * | 9/2002 | McGuire et al. | 709/315 |
| 2003/0028741 A1 * | 2/2003 | Sokolov et al. | 711/171 |

(Continued)

*Primary Examiner* — Hiren Patel
(74) *Attorney, Agent, or Firm* — Lowenstein Sandler LLP

(57) ABSTRACT

A method comprising executing an application on a JAVA virtual machine, the JAVA virtual machine executing on a computing device, the application having allocated memory, monitoring, by the JAVA virtual machine, memory consumed by the application during execution, determining, based on the consumed memory, that the allocated memory is to be adjusted; and adjusting, by the JAVA virtual machine, the allocated memory during runtime without restarting the execution of the application.

11 Claims, 4 Drawing Sheets

(56) References Cited

U.S. PATENT DOCUMENTS

| | | | |
|---|---|---|---|
| 2004/0024798 A1* | 2/2004 | Chauvel | 707/206 |
| 2004/0230762 A1* | 11/2004 | Allen et al. | 711/170 |
| 2005/0198464 A1* | 9/2005 | Sokolov | 711/203 |
| 2005/0235123 A1* | 10/2005 | Zimmer | G06F 12/126 711/170 |
| 2005/0240641 A1* | 10/2005 | Kimura et al. | 707/206 |
| 2007/0106860 A1* | 5/2007 | Foster et al. | 711/170 |
| 2007/0150868 A1* | 6/2007 | Wu et al. | 717/124 |
| 2008/0046673 A1* | 2/2008 | Hwang | 711/170 |
| 2008/0091909 A1* | 4/2008 | Hwang | G06F 9/5016 711/170 |
| 2008/0133867 A1* | 6/2008 | Achanta et al. | 711/170 |
| 2009/0070776 A1* | 3/2009 | Dahlstedt | 719/312 |
| 2009/0112952 A1* | 4/2009 | Adams et al. | 707/206 |
| 2010/0280863 A1* | 11/2010 | Wilcock et al. | 705/7 |
| 2011/0035556 A1* | 2/2011 | Aho et al. | 711/147 |
| 2011/0093748 A1* | 4/2011 | Hogstrom et al. | 714/38.14 |
| 2011/0138147 A1* | 6/2011 | Knowles | G06F 9/5016 711/170 |
| 2011/0320682 A1* | 12/2011 | McDougall | G06F 12/023 711/6 |
| 2012/0017204 A1* | 1/2012 | Hrischuk et al. | 717/151 |
| 2012/0102289 A1* | 4/2012 | Maram et al. | 711/170 |
| 2012/0124018 A1* | 5/2012 | Horii et al. | 707/693 |
| 2012/0272234 A1* | 10/2012 | Kaiser | G06F 11/3442 718/1 |
| 2012/0331018 A1* | 12/2012 | Khanna | 707/813 |

* cited by examiner

ADJUSTING THE OPERATING MEMORY USED BY A VIRTUAL MACHINE DURING RUNTIME

TECHNICAL FIELD

Embodiments of the present invention relate in general to a JAVA Virtual Machine (JVM) and in particular to adjusting the operating memory that is used by a JVM at and during runtime.

BACKGROUND

Every application running in a JVM requires operating memory to run. The amount of the required operating memory depends in part on the type of task the application was created for. An aspect of the JAVA programming language is that the required operating memory needs to be estimated and allocated prior to the execution of the application itself. However, the exact operating memory requirements for every application running on a JVM cannot always be accurately estimated since the execution of the application tends to be non-deterministic, e.g., external applications may be involved during the execution of the application which may affect the amount of required operating memory for the application to run.

Presently, when an application is running in a JVM, a user is typically able to monitor the state of the application. If the application consumes more operating memory than the user expected before starting the application, the user may determine to abort the execution of the application. If the user does not abort the execution of the application, the application may automatically abort with an error message. Either way, the user can then allocate more operating memory to the JVM to run the application and then restart the application. Restarting the application is time-consuming and leads to the unavailability of the application to the users. In addition, if the application consumes less operating memory than what was estimated and allocated before starting the application, the operating system is deprived of operating memory resources that may have been better utilized elsewhere.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

A JAVA Virtual Machine (JVM) may be a set of computer software programs and data structures that use a virtual machine model for the execution of other computer programs and servers. A JVM and its associated components may be implemented on one or more computing devices. In addition, a JVM may function seamlessly across a range of Internet Protocol (IP) and communications networks, and can be accessed by computers, handsets, and other network-enabled devices.

In an example embodiment, a system is provided that runs an application on a JVM and allows for an increase or decrease of the allocated operation memory during the run time without the need to restart the application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
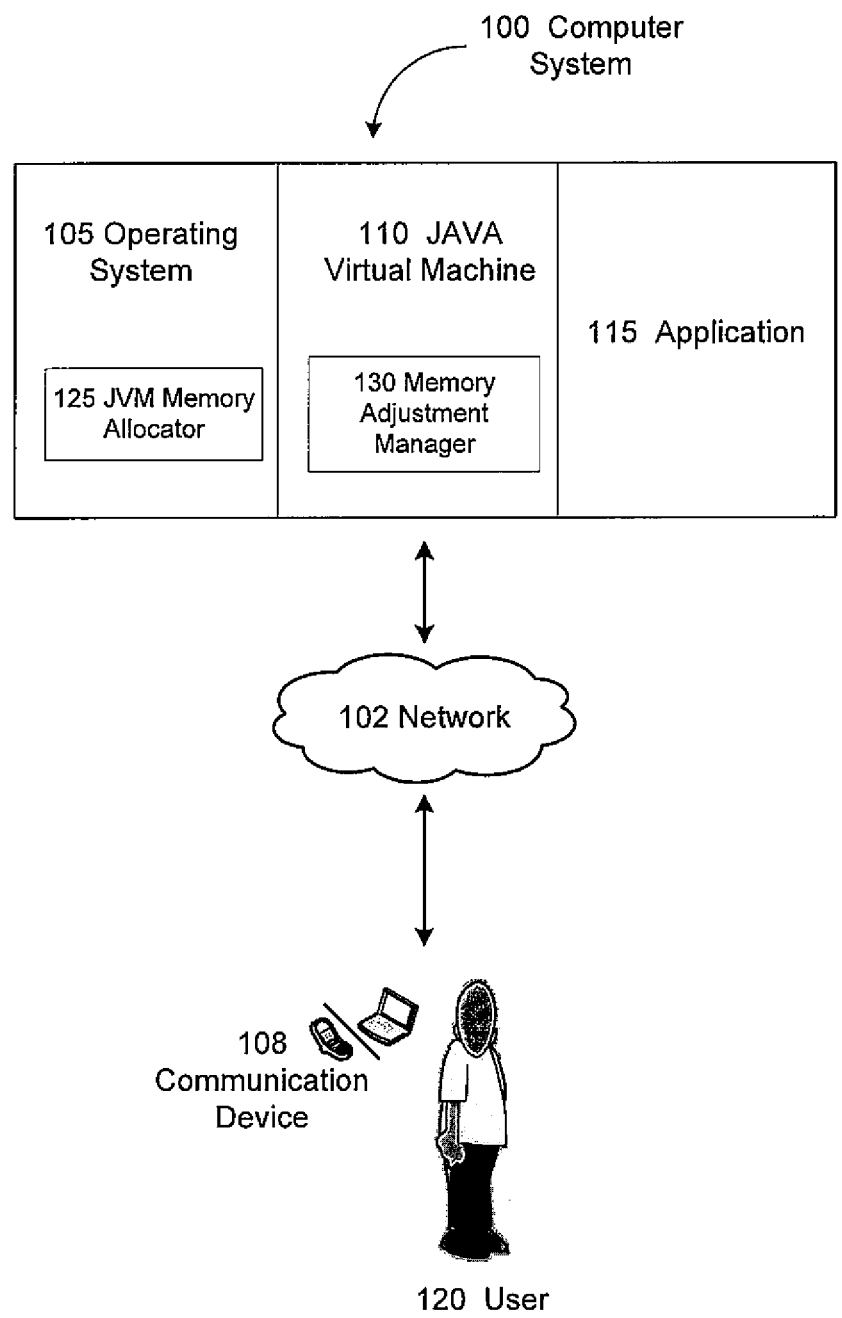
FIG. 1 is a block diagram of a system architecture in which example embodiments of the invention may operate.

FIG. 1 illustrates a block diagram of an example computer system 100 in which embodiments of the present invention may operate. The computer system 100 may be any computing device including, for example, a personal computer (PC), a server computer, a personal digital assistant (PDA), a smart phone, a laptop computer, or any machine capable of executing a set of instructions (sequential or otherwise) that specify actions to be taken by that machine.

The computer system 100 includes an operating system 105. As used herein, the operating system 105 is a set of software that manages computer hardware resources and provides common services for computer programs.

The computer system 100 also includes a JAVA Virtual Machine (JVM) 110 running on the operating system 105. A JVM 110 is a set of computer software programs and data structures that use a virtual machine model for the execution of other computer programs such as compiled Java programs and programs in other languages supported by the JVM (e.g., Python, Ruby, etc.).

The computer system 100 also includes an application 115 such as a Java program, a Python program, a Ruby program or a program in any other language supported by the JVM. As used herein, the application 115 is computer software designed to perform a specific task and executing in the JVM 110. Examples of an application 115 include enterprise software, accounting software, office suites, graphics software, and media players.

The computer system 100 may be communicatively coupled to communication device 108 associated with a user 120 over a network 102. The network 102 may be, for example, a private network (e.g., a local area network (LAN), a wide area network (WAN), intranet, etc.), a corporate network (e.g., a private network for an organization such as a corporation), and/or a public network (e.g., the Internet). It is also noted that the term "user" is used herein to refer to a person who operates and receives beneficial services from the computer system 100 via the communication device 108 associated with a user 120.

The communication device 108 may include computing devices that have a wide range of processing capabilities such as PCs, PDAs, smart phones, laptop computers, tablets, netbooks, etc, and/or any machine capable of executing a set of instructions (sequential or otherwise) that specify actions to be taken by that machine. In an example embodiment, communication device 108 may be a mobile device (e.g., a handheld device, smart phone or web portal device) that communicates with the network 102 via a wireless connection. Alternatively, the computer system 100 can be a user device that the user 120 can interact with via an input device of the computer system 100 (e.g., a mouse, keyboard, touch screen, etc.).

Conventionally, as discussed above, when a JVM 110 executes an application 115, a user is typically able to monitor the state of the application. The user may determine that the size of the operating memory needs to be adjusted. However, the user usually has to stop or abort the execution of the application if the application consumes more operating memory than the user expected before starting the application, and then adjust the operating memory size and re-start the execution of the application.

Embodiments of the present invention overcome the above deficiencies by providing a mechanism that can adjust the size of the operating memory during runtime without having to stop and restart the execution of the application. In particular, in one embodiment, the operating system 105 includes a JVM Memory Allocator 125 for allocating the operating memory to the JVM 110 to run the application 115. If additional operating memory is required to execute a certain application 115, the JVM Memory Allocator 125 may increase the allocation of the operating memory to the JVM 110. If the JVM 110 has an excess of allocated memory for the execution of the application 115, then the JVM Memory Allocator 125 may decrease the allocation of the operating memory to the JVM 110.

The JVM 110 includes a Memory Adjustment Manager 130. After the JVM Memory Allocator 125 adjusts the allocation of the operating memory to the JVM 110, the Memory Adjustment Manager 130 causes the size of the operating memory to be adjusted during the runtime of the application 115.

Figure 2:
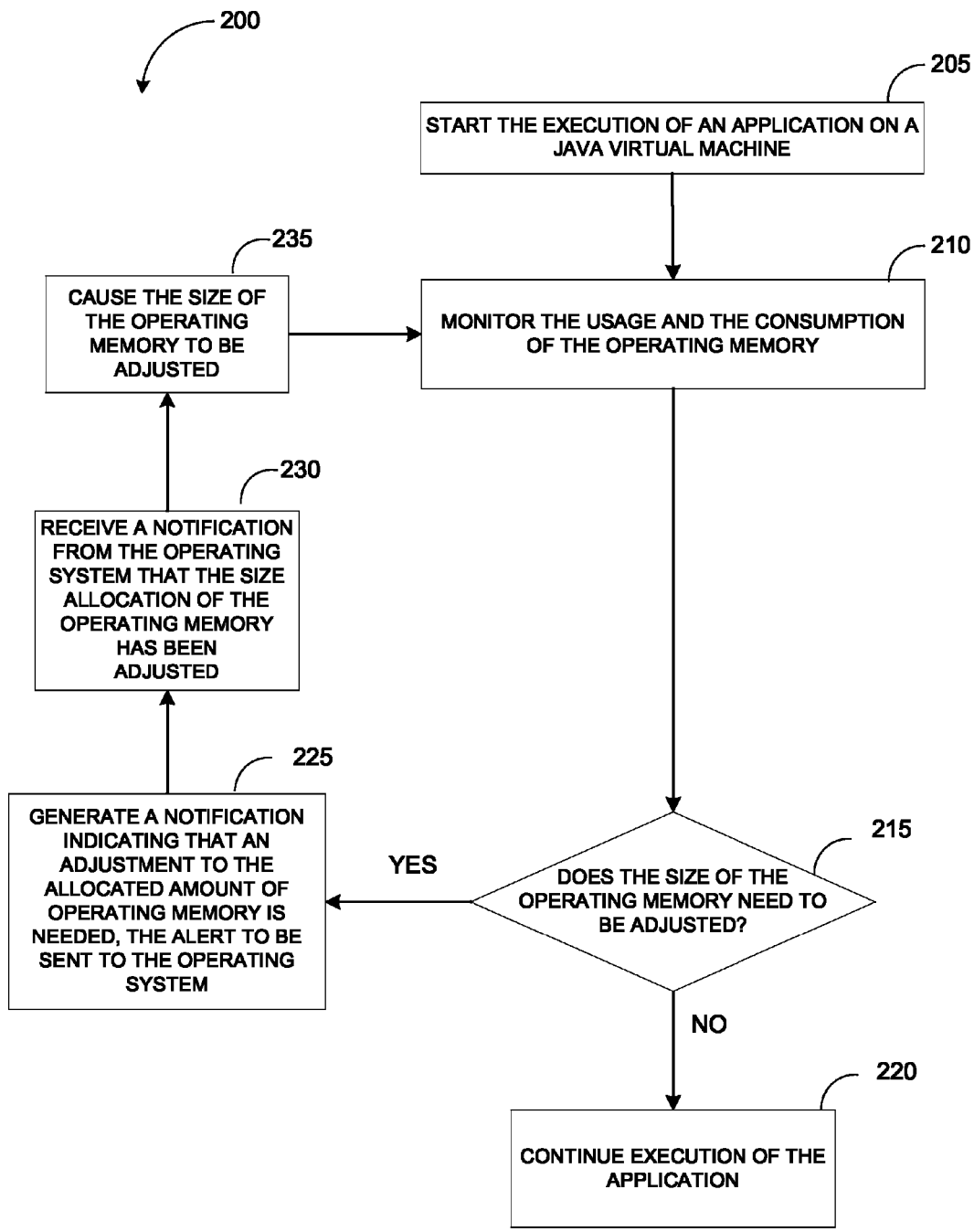
FIG. 2 is a flow diagram illustrating a method for adjusting the operating memory size used by an application executing on a JAVA virtual machine at runtime, in accordance with one example embodiment.

FIG. 2 is a flow diagram illustrating a method 200 for adjusting the operating memory that is used by a JVM 110 during the execution of an application 115, in accordance with one example embodiment. The method 200 may be performed by processing logic that may include hardware (e.g., circuitry, dedicated logic, programmable logic, microcode, etc.), software (e.g., instructions run on a processing device to perform hardware simulation), or a combination thereof. In one example embodiment, the method 200 may be performed by the JVM 110 of FIG. 1.

Referring to FIG. 2, the method 200 begins with the JVM 110 starting to execute an application 115 (block 205). At block 210, the JVM 110 monitors the usage and consumption level of the operating memory that is consumed by the application 115 while the application 115 is executing on the JVM 110. The operating memory may be initially allocated by the operating system 105 based on a user request or a predefined parameter. The JVM 110 may monitor the usage and consumption of the operating memory by the application 115 by monitoring the state of the application 115, which may be represented by the amount of the loaded bytecode of the application 115, the method area size and content of the application 115, the stack size and content of the application 115, and the heap size and heap content of the application 115.

The method area is shared among all JVM threads. The method area may store per-class structures such as the runtime constant pool, field and method data, and the code for methods and constructors, including the special methods used in class and instance initialization and interface type initialization. The stack is the space in the computer memory which stores intermediate values of computation. In other words, the stack may be considered to be the place in the computer memory where the variables are declared, initialized, and stored before the execution of the application 115.

The heap is the part of the computer memory that is used for storing objects and objects' data and variables created or initialized by the application 115 at runtime. The heap is usually the most memory consuming part of the JVM 110. The JVM 110 may monitor the above components of the state of the application to see if any of these components reach a threshold.

At block 215, the JVM 110 determines whether the size of the operating memory should to be adjusted. The JVM 110 can make this determination if the size of the operating memory (e.g., any of the application state components) reaches a maximum threshold (e.g., 80 percent of the operating memory that is allocated to the JVM 110 for executing the application 115) or falls below a minimum threshold. (e.g., 20 percent of the operating memory). The maximum threshold may be lower than the allocated operating memory to enable the JVM 110 to initiate the request for the additional operating memory before the application 115 consumes the entire amount of its allocated operating memory.

If the JVM 110 determines that the size of the operating memory should be adjusted, the JVM 110 causes the size of the operating memory to be adjusted. For example, the JVM 110 may notify the operating system 105 that the JVM 110 needs additional operating memory while executing the application 115 (block 225). In response to such notification, the operating system 105 may allocate the additional operating memory to the JVM 110. The JVM 110 may receive a message from the operating system 105 indicating that the additional operating memory has been allocated to the JVM 110 (block 230). After the JVM 110 receives the message from the operating system 105 indicating that the additional operating memory has been allocated, the JVM 110 may change the state of the application by increasing the maximum boundary of the heap size associated with the application (block 235).

In another example, the JVM 110 may notify the operating system 105 that the JVM 110 has an excess of allocated operating memory for executing the application 115 and that an adjustment to the operating memory is needed (block 225). In response to such notification, the operating system 105 may re-allocate the excess operating memory from the JVM 110. The JVM 110 may receive a message from the operating system 105 indicating that the excess operating memory has been re-allocated from the JVM 110 (block 230). After the JVM 110 receives the message from the operating system 105 indicating that the excess operating memory has been re-allocated (block 235), the JVM 110 may change the state by decreasing the maximum boundary of the heap size. The operating memory can thus be re-allocated by the operating system 105. The excess operating memory may be allocated back to the operating system 105 so that it can be used for a different JVM 110 to execute a different application 115 (block 235).

If it is determined at block 215 that the operating memory does not need to be adjusted, then the execution of the application 115 continues (block 220).

Figure 3:
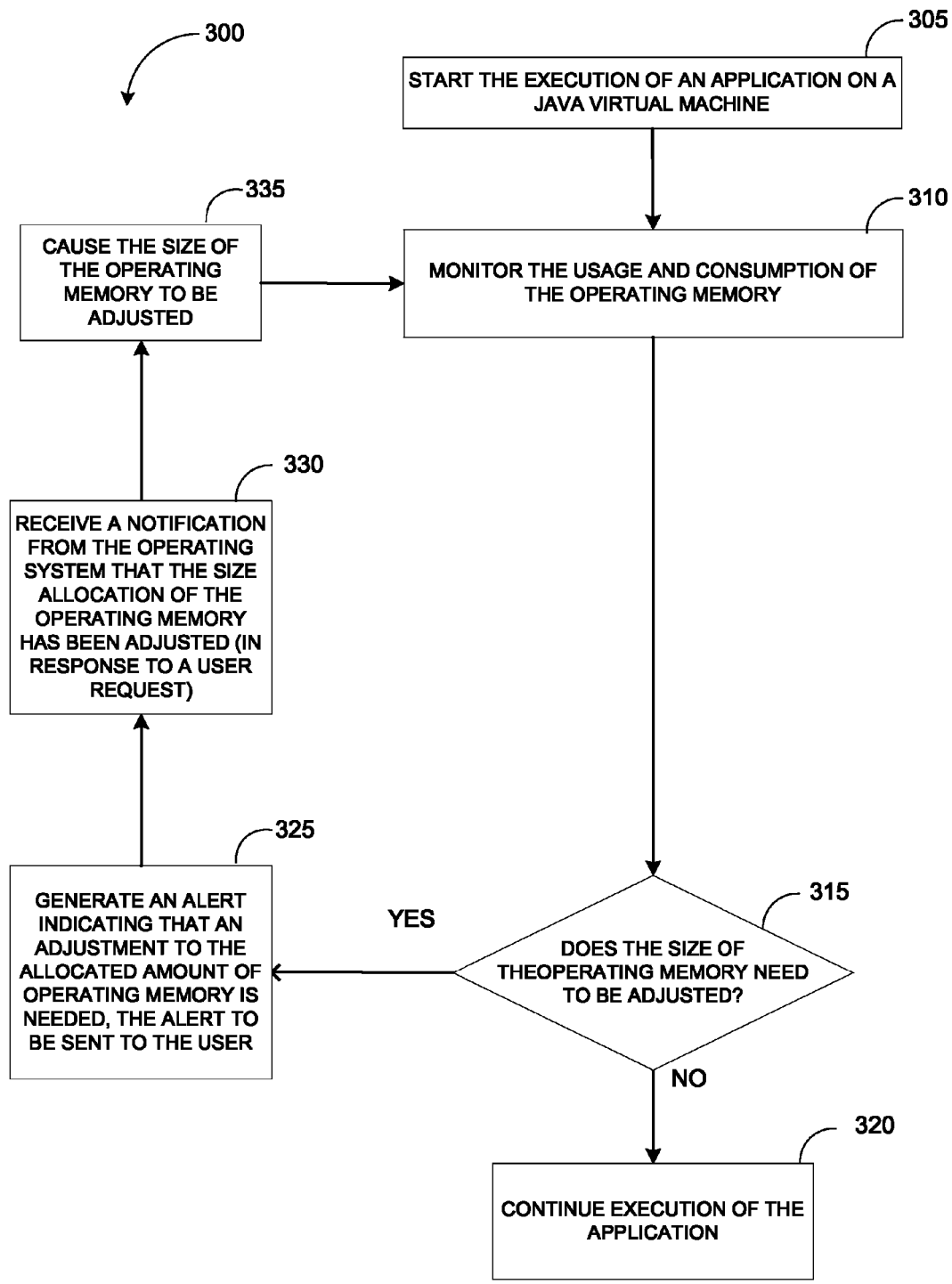
FIG. 3 is a flow diagram illustrating another example embodiment of a method for adjusting the operating memory size used by an application executing on a JAVA virtual machine at runtime.

FIG. 3 is a flow diagram illustrating a method 300 for adjusting the operating memory that is used by a JVM 110 during the execution of an application 115, in accordance with one example embodiment.

Referring to FIG. 3, the method 300 begins with the JVM 110 starting to execute an application 115 (block 305). At block 310, the JVM 110 monitors the usage and consumption level of the operating memory that is consumed by the application 115 while the application 115 is executing on the JVM 110. The JVM 110 may monitor the components of the state of the application as discussed above to see if any of these components reach a threshold.

At block 315, the JVM 110 determines whether the size of the operating memory should to be adjusted. If the JVM 110 determines that the size of the operating memory should be adjusted, the JVM 110 may generate an alert indicating that an adjustment to the allocated amount of operating memory is needed. The alert may be provided (e.g., displayed, sent via email, etc.) to the user or system administrator (block 325). In response to such alert, the user may request an adjustment to the allocated amount of operating memory. The user may request the adjustment by submitting a command (e.g., via a command line interface) or a request (e.g., via a graphical user interface (GUI)). The command or request may be received by the operating system which may adjusted the allocated amount of the operating memory. The JVM 110 may receive a message from the operating system 105 indicating that the allocation of the operating memory has been adjusted to the JVM 110 (block 330). After the JVM 110 receives the message from the operating system 105, the JVM 110 may change the state of the application as discussed above by either increasing or decreasing the maximum boundary of the heap size associated with the application (block 335).

If it is determined at block 315 that the operating memory does not need to be adjusted, then the execution of the application 115 continues (block 320).

Figure 4:
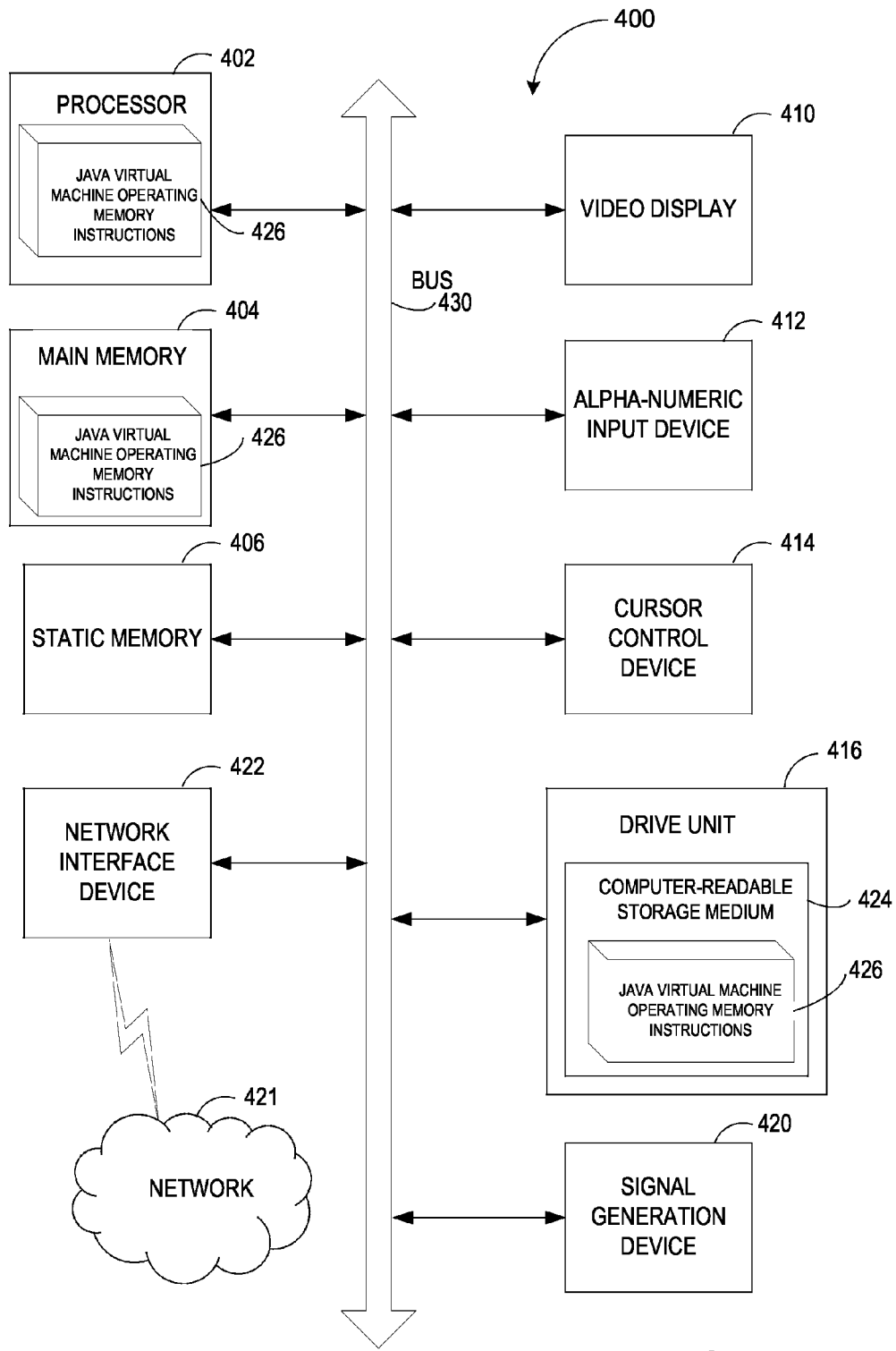
FIG. 4 illustrates a diagrammatic representation of a machine in the form of a computer system, in accordance with one example embodiment.

FIG. 4 illustrates a diagrammatic representation of a machine in the form of a computer system 400 within which a set of JVM operating memory instructions 426, for causing the machine to perform any one or more of the methodologies discussed herein, may be executed. In alternative example embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory 416 (e.g., a data storage device), which communicate with each other via a bus 430.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute authentication tool 300 for performing the operations and steps discussed herein.

The computer system 400 may further include a network interface device 422. The network interface device may be in communication with a network 421. The computer system 400 also may include a video display unit 410 (e.g., a liquid crystal display (LCD), a touch screen, or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a computer-readable storage medium (or more specifically a non-transitory computer-readable storage medium) 424 on which is stored one or more sets of JVM operating memory instructions 426 for the computer data processing system 100 embodying any one or more of the methodologies or functions described herein. The JVM operating memory instructions 426 for the computer data processing system 100 may also reside, completely or at least partially, within the main memory 404 and/or within the processing device 402 during execution thereof by the computer system 400, the main memory 404 and the processing device 402 also constituting computer-readable storage media. The JVM operating memory instructions 426 for the computer data processing system 100 may further be transmitted or received over a network via the network interface device 422.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of JVM operating memory instructions 426. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "monitoring," "determining," "adjusting," "sending," "receiving," "authenticating," "refraining," "identifying," "specifying," "granting," "accessing,"

"assigning," "executing," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   executing, by a processing device, an application on a Java virtual machine (JVM), the JVM executed by the processing device on a computing device, the application having allocated memory;
   monitoring, by the JVM, memory consumed by the application during execution, wherein the monitoring of the memory consumed by the application comprises monitoring a current state of the application, the current state of the application being represented by a loaded bytecode of the application, a method area of the application, a stack of the application and a heap of the application;
   determining, by the JVM, whether the memory consumed by the application during execution is below a threshold, wherein determining whether the memory consumed by the application is below the threshold comprises comparing each of a size of the loaded bytecode of the application, a size of the method area of the application, a size of the stack of the application and a size of the heap of the application with the threshold, and determining whether any of the size of the loaded bytecode of the application, the size of the method area of the application, the size of the stack of the application or the size of the heap of the application is below the threshold in view of the comparing;
   responsive to determining that the memory consumed by the application during execution is below the threshold, sending, by the JVM, a request to an operating system to adjust a size of the allocated memory, wherein the sending comprises providing, by the JVM, a notification to the operating system to request the operating system to reallocate an excess in the allocated memory associated with the application, wherein the monitoring, the determining, and the sending are performed automatically;
   receiving, from the operating system, a message indicating that the size of the allocated memory has been adjusted by the operating system; and
   responsive to receiving the message, adjusting, by the JVM, a state of the application during runtime without restarting the execution of the application, wherein the adjusting comprises:
      decreasing a maximum boundary of the heap of the application in view of the excess in the allocated memory.

2. The method of claim 1, further comprising:
   determining, whether the memory consumed by the application during execution is above a threshold; and
   responsive to determining that the memory consumed by the application during execution is above the threshold, sending a second request to the operating system to adjust the size of the allocated memory;
   receiving, from the operating system, a second message indicating that the size of the allocated memory is adjusted; and
   responsive to receiving the second message, adjusting the state of the application during runtime without restarting the execution of the application, wherein the adjusting comprises
   increasing a maximum boundary of the size of the heap.

3. The method of claim 1, further comprising
   generating an alert indicating that the allocated memory is adjusted, the alert to be provided to a user.

4. The method of claim 1, wherein in response to sending the request to the operating system, the method further comprises:
   receiving an indication from the operating system of a reallocation of a portion of adjusted memory; and
   increasing a boundary of the heap associated with the different JVM in view of the reallocation.

5. A non-transitory computer readable storage medium including instructions that, when executed by a processing device, cause the processing device to:
   execute an application on a Java virtual machine (JVM), the JVM executed by the processing device on a computing device, the application having allocated memory;
   monitor, by the JVM, memory consumed by the application during execution, wherein to monitor the memory consumed by the application during execution is to monitor a current state of the application, the current state of the application being represented by a loaded bytecode of the application, a method area of the application, a stack of the application and a heap of the application, determine, by the JVM, whether the memory consumed by the application during execution is below a threshold, wherein determining whether the memory consumed by the application is below the threshold comprises comparing each of a size of the loaded bytecode of the application, a size of the method area of the application, a size of the stack of the application and a size of the heap of the application with the threshold, and determining whether any of the size of the loaded bytecode of the application, the size of the method area of the application, the size of the stack of the application or the size of the heap of the application is below the threshold in view of the comparing;

responsive to determining that the memory consumed by the application during execution is below the threshold, send, by the JVM, a request to an operating system to adjust a size of the allocated memory, wherein the sending comprises providing, by the JVM, a notification to the operating system to request the operating system to reallocate an excess in the allocated memory associated with the application, wherein the monitoring, the determining, and the sending are performed automatically;

receive, from the operating system, a message indicating that the size of the allocated memory has been adjusted by the operating system; and responsive to receiving the message, adjust, by the JVM, a state of the application during runtime without restarting the execution of the application, wherein to adjust, the processing device to:

decrease a maximum boundary of the heap of the application in view of the excess in the allocated memory.

6. The non-transitory computer readable storage medium of claim 5, wherein the processing device is further to determine, in view of the memory consumed by the application during execution is above a threshold; and send a second request to the operating system to adjust the size of the allocated memory responsive to determining that the memory consumed by the application during execution is above the threshold;

receive, from the operating system, a second message indicating that the size of the allocated memory is adjusted; and responsive to receiving the second message, adjust the state of the application during runtime without restarting the execution of the application, wherein, to adjust the state of the application, the processing device is to increase a maximum boundary of the size of the heap.

7. The non-transitory computer readable storage medium of claim 5, wherein the processing device is further to generate an alert indicating that the allocated memory is adjusted, the alert to be provided to a user.

8. The non-transitory computer readable storage medium of claim 5, wherein in response to sending the request to the operating system, the processing device is further to:

receive an indication from the operating system of a reallocation of a portion of adjusted memory; and increase a boundary of the heap associated with the different JVM in view of the reallocation.

9. An apparatus comprising:

a memory; and a processing device communicably coupled to the memory, the processing device to execute a Java virtual machine (JVM) to:

execute an application on the JVM, the application having allocated memory;

monitor memory consumed by the application during execution, wherein to monitor the memory consumed by the application during execution, is to monitor a current state of the application, the current state of the application being represented by a loaded bytecode of the application, a method area of the application, a stack of the application and a heap, determine whether the memory consumed by the application during execution is below a threshold, wherein to determine whether the memory consumed by the application is below the threshold, the processing device is to compare each of a size of the loaded bytecode of the application, a size of the method area of the application, a size of the stack of the application and a size of the heap of the application with the threshold, and to determine whether any of the size of the loaded bytecode of the application, the size of the method area of the application, the size of the stack of the application or the size of the heap of the application is below the threshold in view of the comparing;

responsive to determining that memory consumed by the application during execution is below the threshold, send a request to an operating system to adjust a size of the allocated memory, wherein to send the request to the operating system, the processing device is to provide, via the JVM, a notification to the operating system to request the operating system to reallocate an excess in the allocated memory associated with the application, wherein the processing device is to perform the monitoring, the determining, and the sending automatically;

receive, from the operating system, a message indicating that the size of the allocated memory has been adjusted by the operating system; and responsive to receiving the message, adjust a state of the application during runtime without restarting the execution of the application, wherein to adjust, the processing device to:

decrease a maximum boundary the of the application in view of the excess in the allocated memory.

10. The apparatus of claim 9, wherein the processing device is further to determine, whether the memory consumed by the application during execution is above a threshold; and send a second request to the operating system to adjust the size of the allocated memory responsive to determining that the memory consumed by the application during execution is above the threshold;

receive, from the operating system, a second message indicating that the size of the allocated memory is adjusted; and responsive to receiving the second message, adjust the state of the application during runtime without restarting the execution of the application, wherein, to adjust the state of the application, the processing device is to increase a maximum boundary of the size of the heap.

11. The apparatus of claim 9, wherein in response to sending the request to the operating system, the processing device is further to:

receive an indication from the operating system of a reallocation of a portion of adjusted memory; and increase a boundary of the heap associated with the different JVM in view of the reallocation.

\* \* \* \* \*